United States Patent [19]

Schwalm et al.

[11] Patent Number: 5,470,113
[45] Date of Patent: Nov. 28, 1995

[54] CONNECTOR FOR PLASTIC TUBES

[75] Inventors: Dieter Schwalm, Bielefeld; Rainer Neumann, Herten, both of Germany

[73] Assignee: Vulkan Lokring GmbH, Herne, Germany

[21] Appl. No.: 242,288

[22] Filed: May 13, 1994

[30] Foreign Application Priority Data

May 13, 1993 [DE] Germany .............. 9307262 U

[51] Int. Cl.⁶ ............................................. F16L 13/14
[52] U.S. Cl. .................. 285/255; 285/259; 285/382.2; 285/421
[58] Field of Search ........................... 285/255, 249, 285/242, 382, 382.2, 259, 421

[56] References Cited

U.S. PATENT DOCUMENTS

| 3,817,561 | 6/1974 | Kay | 285/259 |
|---|---|---|---|
| 4,021,061 | 5/1977 | Zimmerman | 285/255 |
| 4,088,349 | 5/1978 | Guest | 285/255 |
| 4,220,359 | 9/1980 | Evenson et al. | 285/249 |
| 4,257,629 | 3/1981 | Maple et al. | 285/249 |
| 4,598,938 | 7/1986 | Boss et al. | 285/382.2 |
| 4,858,968 | 8/1989 | Moebius | 285/382.2 |
| 4,911,484 | 3/1990 | Hackforth | 285/382.2 |
| 5,332,269 | 7/1994 | Homm | 285/249 |

FOREIGN PATENT DOCUMENTS 0048003  3/1982  European Pat. Off. .

*Primary Examiner*—Eric K. Nicholson
*Attorney, Agent, or Firm*—Robert W. Becker & Associates

[57] ABSTRACT

A connector for cylindrical plastic tubes has a metallic inner sleeve with an outer diameter that is greater than in inner diameter of the plastic tubes to be connected. The inner sleeve has a free end and a securing flange positioned opposite the free end. A metallic sliding sleeve for being slipped onto a section of the plastic tube having inserted therein the inner sleeve is provided. The inner sleeve has an outer surface with at least one circumferential rib of a substantially rectangular cross-section. The sliding sleeve has a leading end and a rearward end in the direction of sliding onto the section. The sliding sleeve has an inner surface that beginning at the leading end and ending at the rearward end, has sequentially: a first conically narrowing zone, a second conically narrowing zone, a cylindrical zone, a third conically narrowing zone, and a cylindrical zone. In a preferred embodiment, two inner sleeves are fixedly connected to one another in a mirror-symmetrical arrangement to form a unitary sleeve member.

7 Claims, 2 Drawing Sheets

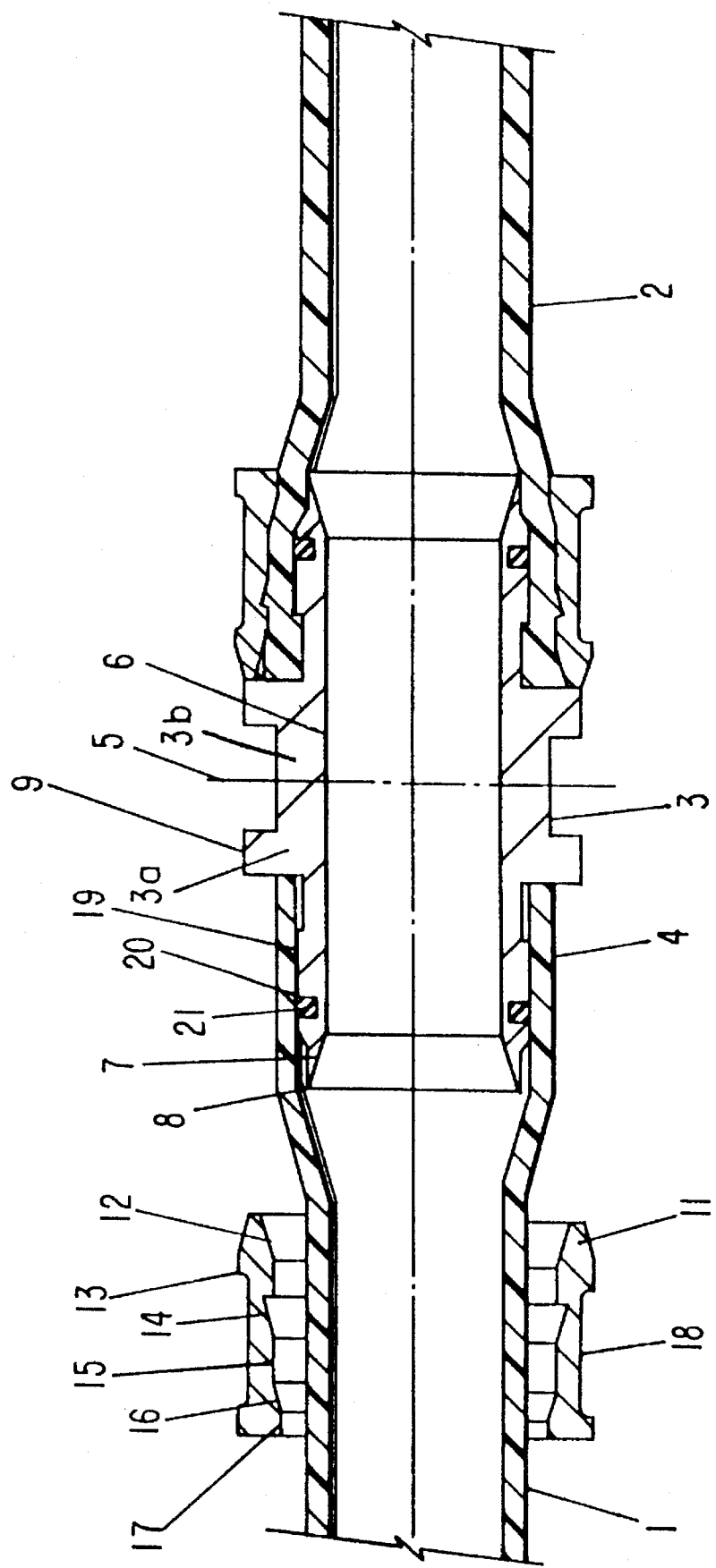

CONNECTOR FOR PLASTIC TUBES

BACKGROUND OF THE INVENTION

The present invention relates to a non-detachable sliding sleeve connector for cylindrical plastic tubes. It comprises a metallic inner sleeve with a securing flange and an outer textured surface, whereby the outer diameter of the inner sleeve is greater than the inner diameter of the plastic tubes in the initial state, and comprises a metallic sliding sleeve which can be pressed onto the plastic tube section within the area of the inner sleeve.

In a known sleeve connector of this kind the outer surface of the inner sleeve is provided with a plurality of narrow ribs (textured surface) of a small radial thickness. The outer sleeve is provided in its central area with a single circumferential groove of an approximately triangular cross-section. With this connector, no uniform radial compression of the plastic tubes is provided over the length of the connector. Especially at the free end face of the inner sleeve there is the risk of a gap being formed between the inner sleeve and the inner wall of the tube. Furthermore, with this connector the resistance provided against pulling out and rotation of the plastic tubes is not satisfactory. With the present invention these disadvantages are to be overcome.

It is therefore an object of the present invention to improve a sliding sleeve connector for cylindrical plastic tubes of the aforementioned kind such that the end of the plastic tube that is clamped within the connector is subjected over its entire axial length to a high pressure load which should be as uniform as possible, that a gap formation at the end of the inner sleeve is prevented, and that the connection can be produced with conventional manually activated tools without problems.

BRIEF DESCRIPTION OF THE DRAWINGS

This object, and other objects and advantages of the present invention, will appear more clearly from the following specification in conjunction with the accompanying drawings, in which:

FIG. 2 shows an axial section of a second embodiment of a connector for two plastic tubes whereby the sliding sleeve is represented in the same manner as in FIG. 1.

SUMMARY OF THE INVENTION

Figure 1:
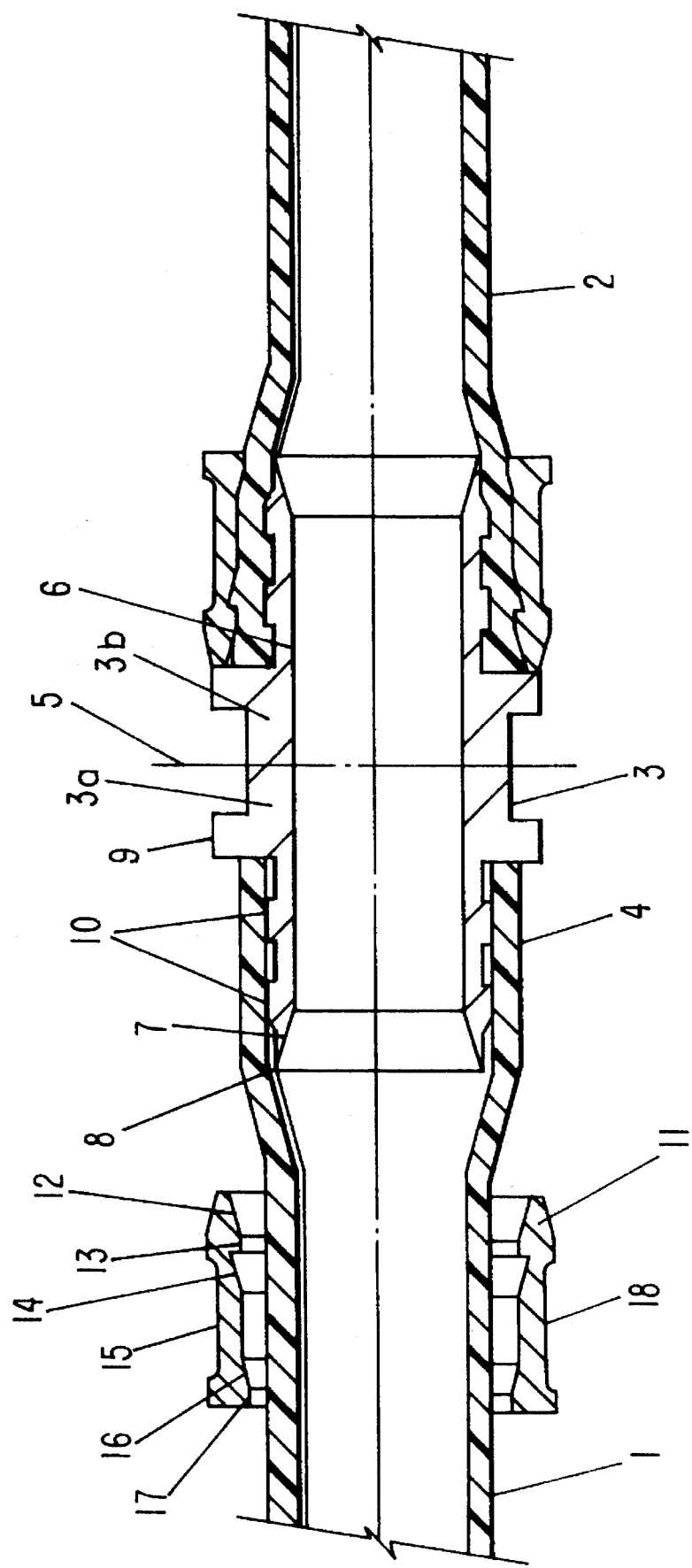
FIG. 1 shows an axial section of a first embodiment of a connector of two adjacently positioned plastic tubes whereby the sliding sleeve is represented before the pressing step and after completion of the connection.

The connector for cylindrical plastic tubes according to the present invention is primarily characterized by:

A metallic inner sleeve having an outer diameter that is greater than an inner diameter of the plastic tubes to be connected;

The inner sleeve having a free end and a securing flange positioned opposite the free end;

A metallic sliding sleeve for sliding onto a section of the plastic tube having inserted therein the inner sleeve;

The inner sleeve having an outer surface with at least one circumferential rib of a substantially rectangular cross-section;

The sliding sleeve having a leading end and a rearward end in the direction of sliding onto the section; and The sliding sleeve having an inner surface that beginning at the leading end and ending at the rearward end, has sequentially arranged: a first conically narrowing zone, a second conically narrowing zone, a cylindrical zone, a third conically narrowing zone, and a cylindrical zone.

Preferably, between the first and the second conically narrowing zone a transition zone is located that is essentially saw toothed-shaped in cross-section.

Advantageously, the axial distance between the securing flange and the free end of the inner sleeve is substantially equal to the axial length of the sliding sleeve.

Expediently, the connector further comprises a sealing ring made of a soft plastic material, wherein the inner sleeve has only one of the circumferential ribs of a substantial width, whereby the circumferential rib has a circumferential groove for receiving the sealing ring.

In a preferred embodiment of the present invention, the sealing ring is an O-ring.

Advantageously, the inner sleeve has an inner surface that at the free end has a conical zone tapering radially inwardly in the axial direction and the free end has a circumferential end face that is substantially shaped as a cutting edge.

Advantageously, the outer surface of the inner sleeve has two circumferential ribs with a cylindrical external surface, the two circumferential ribs spaced from one another and having substantially the same width.

In a preferred embodiment of the present invention, the connector for connecting two plastic tubes comprises two of the inner sleeves that are positioned mirror-symmetrical to one another and are connected to one another so as to form one unitary sleeve member with the free ends oppositely arranged, wherein the two plastic tubes are secured to the free ends.

According to the present invention, the inner sleeve is provided at its outer surface with at least one circumferential rib having a substantially rectangular cross-section and the sliding sleeve has at its inner surface when viewed from the leading edge that during sliding onto the plastic tube is at the front, a first conically narrowing zone, a subsequently arranged second conically narrowing zone, a cylindrical zone and at its other end first a conically narrowing zone and then a short cylindrical zone.

The sliding sleeve of this connector has a relatively long insertion area which reduces the forces required for mounting. Furthermore, less tube material is displaced forwardly during mounting so that an optimal use of the thickness of the plastic tube wall in the clamping area is achievable. Furthermore, the cooperation between the circumferential recess within the sliding sleeve and the relatively wide rib at the outer surface of the inner sleeve a kind of anchoring of the tube material on the inner sleeve is provided whereby at the same time a possible spring-back resilience of the sliding sleeve is prevented.

For improving the anchoring action it is advantageous to provide the transition between the first and second conically narrowing zones in the interior of the sliding sleeve in a saw toothed-shaped manner.

Furthermore it is expedient to adapt the axial length of the inner sleeve between its end face and the securing flange to approximately the entire axial length of the sliding sleeve.

In a first embodiment of the present invention the outer surface of the inner sleeve is provided with two circumferential ribs that are spaced from one another and are approximately of the same axial width and have a cylindrical mantle surface.

For plastic tubes made of a relatively hard plastic material, which are thus not as easily deformable and cannot be pressed so easily into the recesses, it is advantageous to provide the rib with a circumferential groove. The groove serves to receive a sealing ring made of a soft plastic material in order to thereby achieve an additional sealing function which is also effective in case of rotation of the tubes. With the additional soft sealing function, for example, provided by an O-ring, it is furthermore possible to compensate possibly occurring shrinkage of the plastic tube material.

According to a further advantageous embodiment the inner sleeve at its inner end is provided with a radially inwardly tapering conical zone (third conically narrowing zone) whereby the end face is in the form of a cutting edge. This embodiment ensures a smooth transition between plastic tube and inner sleeve and prevents an undesirable increase of the flow resistance and turbulances. Furthermore, due to the effect of the bead at the rearward end of the sliding sleeve, the plastic material is fixedly pressed against the inner sleeve so that at this location no gap can occur which would be prone to cause depositions or result in gap corrosion.

For the connection of two adjacently arranged cylindrical tubes it is suggested in an advantageous further embodiment that two inner sleeves as described above are arranged in a mirror-symmetrical arrangement and connected to form a one-part double inner sleeve member onto which the plastic tubes to be connected are slipped from opposite ends. Subsequently, two identical sliding sleeves are pressed onto the inner sleeves with suitable tools until they abut at the corresponding securing flanges of the inner sleeves.

DESCRIPTION OF PREFERRED EMBODIMENTS

The present invention will now be described in detail with the aid of several specific embodiments utilizing FIGS. 1 and 2.

The embodiments of the sliding sleeve connector shown in the drawing are to be used for producing a highly stable connection between the ends of two identical cylindrical tubes 1, 2 made of plastic material. The plastic tubes 1, 2 are positioned with their end sections opposite to one another and are slipped onto a one-part inner sleeve member 3 made of metal, for example, brass, whereby the tubes 1, 2 at their end section are provided with a cup-shaped widened portion 4. The elasticity of the plastic material of the tubes thereby provides for a certain radial clamping pressure onto the inner sleeve 3.

The inner sleeve member 3 relative to the central plane 5 is comprised of two identical halves 3a, 3b mirror symmetrically arranged relative to one another. It has a cylindrical through bore 6 which on either end is provided with a funnel-shaped widened end section. The free ends have a cutting-edge-shaped free end face 8.

Each of the two sleeve halves (inner sleeves) 3a, 3b of the inner sleeve member 3 is limited in its receiving length by a securing flange 9 which flanges are spaced from one another in the axial direction. At the outer surface of each inner sleeve 3a, 3b two circumferential ribs 10 of approximately the same axial width are provided with a rectangular cross-section and with a cylindrical mantle surface. The distance between the two ribs 10 and the distance to the free ends of the respective inner sleeve 3a, 3b as well as to the securing flange 9 are approximately identical and correspond substantially to the axial width of a rib 10.

The drawings shows in the left half a metallic sliding sleeve 11 in its initial state, i.e., before being pressed onto the plastic tube and the inner sleeve. The inner surface of the sliding sleeve 11, when viewed from the leading end, is comprised of a first conically narrowing zone 12, a short cylindrical zone 13, a second conically narrowing zone 14, a longer cylindrical zone 15, a third conically narrowing zone 16, and a short cylindrical zone 17. The outer mantle surface is provided with a relatively wide circumferential recess 18. The two first conically narrowing zones 12, 14, when viewed in cross-section, have a saw tooth-shaped transition 13 into one another.

With the aid of a suitable tool for coaxially moving the two sleeves toward one another, the sliding sleeves 11 are pressed sequentially onto the end sections of the plastic tubes 1, 2. The end position of the sliding sleeve 11 is represented in the drawings in the right half of FIGS. 1 and 2. Due to the deformability of the plastic material the end section of the tubes 1, 2 is deformed such that the annular space between the metallic sleeves 3a, 3b, 11 is completely filled as shown in the right half of FIG. 1.

The representation of FIG. 1 shows that at the inner surface of the tube 2 two ribs are formed that are adjacent to one another in the axial direction which affect a fixed clamping of the tube 2 to the inner sleeve member 3. Furthermore, the representation shows that at the rearward end of the sliding sleeve 11 the bead which is formed by the cylindrical zone 17 and which projects inwardly, provides for an additional pressing of the tube material against the wall of the inner sleeve member 3. This prevents the formation of an undesirable gap. Furthermore, with the conical end section 8 of the inner sleeve member 3 a smooth transition between the inner wall of the tube 2 and the inner sleeve member 3 is provided.

The embodiment according to FIG. 2 corresponds substantially to the embodiment of FIG. 1 with the exception of an alteration at the outer surface of the clamping area of the inner sleeve 3. In contrast to the first embodiment, the inner sleeves 3a, 3b of the inner sleeve member 3 in the second embodiment are provided with a single rib 19 which in the axial direction is relatively wide whereby in the outer wall of this rib a circumferential groove 20 is provided for receiving a sealing ring 21 made of an elastomer. This embodiment is especially suitable for tubes made of a harder plastic material which cannot be that easily deformed. In such cases the sealing ring 21, for example, an O-ring, ensures an additional sealing effect which is also effective for a possible rotation of the tubes 1, 2 relative to the inner sleeve member 3.

The inventive sliding sleeve connector is advantageously usable in all cases where tubes made of plastic material are to be used for guiding flowing media such as liquids or gases, for example, in sanitary devices. It also provides the great advantage that with a minimum amount of material in a short period of time a non-detachable connection between plastic tubes with a high functional safety can be provided at the respective location of use.

The present invention is, of course, in no way restricted to the specific disclosure of the specification and drawings, but also encompasses any modifications within the scope of the appended claims.

What we claim is:

1. A connector for cylindrical plastic tubes, said connector comprising:

a metallic inner sleeve having an outer diameter that is greater than an inner diameter of the plastic tubes to be connected;

said inner sleeve having a free end and a securing flange positioned opposite said free end;

a metallic sliding sleeve for sliding onto a section of the plastic tube, the plastic tube having inserted therein said inner sleeve;

said inner sleeve having an outer surface with at least one circumferential rib of a substantially rectangular cross-section;

said sliding sleeve having a leading end and a rearward end in a direction of sliding onto said section;

said sliding sleeve having an inner surface that, beginning at said leading end and ending at said rearward end, has sequentially arranged thereat: a first conically narrowing zone, a second conically narrowing zone, a cylindrical zone, a third conically narrowing zone, and a cylindrical zone; and wherein between said first and said second conically narrowing zone a transition zone is located, said transition zone being sawtooth-shaped in cross-section.

2. A connector according to claim 1, wherein an axial distance between said securing flange and said free end of said inner sleeve is substantially equal to the axial length of said sliding sleeve.

3. A connector according to claim 2, further comprising a sealing ring made of a soft plastic material, wherein said inner sleeve has only one of said circumferential ribs of a substantial width, said one circumferential rib having a circumferential groove for receiving said sealing ring.

4. A connector according to claim 3, wherein said sealing ring is an O-ring.

5. A connector according to claim 2, wherein said inner sleeve has an inner surface that at said free end has a conical zone tapering radially inwardly in the axial direction, and wherein said free end has a circumferential end face substantially shaped as a cutting edge.

6. A connector according to claim 1, wherein said outer surface of said inner sleeve has two of said circumferential ribs with a cylindrical external surface, said two circumferential ribs spaced from one another and having substantially the same width.

7. A connector according to claim 1 for connecting two plastic tubes, wherein two of said inner sleeves are positioned mirror-symmetrical to one another and are connected to one another so as to form one unitary sleeve member with said free ends oppositely arranged, wherein the two plastic tubes are secured to said free ends.

* * * * *

UNITED STATES PATENT AND TRADEMARK OFFICE
CERTIFICATE OF CORRECTION

PATENT NO. : 5,470,113
DATED : November 28, 1995
INVENTOR(S) : Schwalm et al

It is certified that error appears in the above-indentified patent and that said Letters Patent is hereby corrected as shown below:

On the title page:

Item [73] Assignee: Vulkan Lokring GmbH & Co. KG, Herne Germany

Signed and Sealed this

Sixteenth Day of December, 1997

Attest:

BRUCE LEHMAN

Attesting Officer    Commissioner of Patents and Trademarks